(12) United States Patent
Krueger

(10) Patent No.: US 6,564,470 B2
(45) Date of Patent: May 20, 2003

(54) ROASTING APPLIANCE

(75) Inventor: Andreas Krueger, Reinbek (DE)

(73) Assignee: Alfred C. G. Nolte KG, Reinbek (DE)

( * ) Notice: Subject to any disclaimer, the term of this patent is extended or adjusted under 35 U.S.C. 154(b) by 110 days.

(21) Appl. No.: 09/803,585

(22) Filed: Mar. 9, 2001

(65) Prior Publication Data

US 2001/0023544 A1 Sep. 27, 2001

(51) Int. Cl.[7] .............................................. D06E 58/00
(52) U.S. Cl. ........................... 34/134; 34/137; 34/594; 34/605; 34/610; 34/225; 34/231; 34/233; 99/474; 99/476
(58) Field of Search ........................ 34/576, 582, 591, 34/594, 168, 169, 174, 177, 605, 610, 134, 137, 138, 139, 141, 142, 218, 219, 222, 224, 225, 228, 231, 233, 360, 369, 371, 504, 505, 509; 99/423, 407

(56) References Cited

U.S. PATENT DOCUMENTS

| | | | |
|---|---|---|---|
| 3,408,920 A | * 11/1968 | Smith | 99/407 |
| 4,419,834 A | 12/1983 | Scott | 34/57 A |
| 4,914,834 A | * 4/1990 | Sime | 34/169 |
| 5,292,005 A | 3/1994 | Wireman et al. | 209/144 |
| 5,564,331 A | * 10/1996 | Song | 99/469 |
| 6,112,644 A | * 9/2000 | Song | 99/323.7 |

FOREIGN PATENT DOCUMENTS

| | | |
|---|---|---|
| EP | 137 556 A1 | 4/1985 |
| EP | 756 145 A2 | 1/1997 |
| EP | 965 279 A2 | 12/1999 |

OTHER PUBLICATIONS

U.S. patent application No. 09/335,247 (now abandoned) (cited to provide full English language translation for EP 965 279 A2 cited above).

* cited by examiner

Primary Examiner—Jiping Lu
(74) Attorney, Agent, or Firm—Howson and Howson (57) ABSTRACT

An appliance for thermally processing granular material, especially for roasting food items such as coffee beans. The granular material lies on a perforated base through which gas flows upwardly to create a fluidized bed. The exhaust gas is fed to a cyclone separator for separation of entrained solid particles. Preferably, the base is located in an inner chamber which is at least partially enclosed in an outer chamber forming the cyclone separator. The exhaust gas is fed into a top opening of the outer chamber thereby providing a rotary gas flow. Alternatively, the base is located in an outer chamber in which at least the area above the base is designed as the cyclone separator. The outer chamber at least partially encloses an inner chamber through which gas is fed to create a rotary gas flow. In both cases, an extremely compact roaster design is realized.

13 Claims, 6 Drawing Sheets

ROASTING APPLIANCE

FIELD OF THE INVENTION

The invention pertains to an appliance for the thermal processing of granular material, wherein the material to be processed lies on a perforated base, a gas flows through the base from below, and the exhaust gas can be fed behind the fluidized bed to a cyclone separator for the separation of entrained solid particles. In particular, the invention pertains to an appliance for roasting food items such as coffee beans, nuts or almonds, so that in the following description, the topic is usually a coffee roaster, but this does not imply a restriction.

BACKGROUND OF THE INVENTION

In the processing of coffee it is essential that it be roasted. Thus, there are roasting appliances that can thermally process the raw coffee until it attains the desired degree of roasting. Such roasting appliances can be divided into discontinuously and continuously roasting ovens. For great quantities, it is often practical to use continuously roasting appliances. Such roasting appliances are known, e.g., from EP 0 756 145 A2, EP 0 965 279 A2 or U.S. Pat. No. 4,419,834 and EP 0 137 556 A1.

In the discontinuously roasting process, a predetermined quantity of the material is subjected to the necessary temperature over the desired time duration. Contact roasters are frequently employed. Here, relatively high temperatures are required in order to ensure that the filled charge is fully roasted through and through. It is also known that the material can be charged from below so as to establish a fluidized bed. Then it is also possible to roast at lower temperatures. In such roasting ovens it is necessary for the entrained solid particles, the so-called chaff, to be removed from the gas flow in a separator following the fluidized bed. For instance, a roasting appliance is known from U.S. Pat. No. 5,292,005, in which a cyclone separator is arranged above the fluidized bed. However, such a roaster is very tall.

OBJECTS OF THE INVENTION

Fundamental to the invention is an objective to design a discontinuously functioning appliance of the type described in the introduction, which is as compact as possible. In addition, both the thermal losses and the pressure losses should be kept as low as possible.

SUMMARY OF THE INVENTION

The objective is realized according to a first embodiment of the invention in that the sieve base is located in an inner chamber, which is at least partially enclosed in an outer chamber forming the cyclone separator, and into which the exhaust gas can be fed from the top in a rotary flow.

According to a second embodiment of the invention, the sieve base is located in an outer chamber, in which at least the area above the perforated base is designed as the cyclone separator. The outer chamber at least partially encloses an inner chamber, through which the gas can be fed from beneath the perforated base into the outer chamber in a rotary flow.

Common to both designs is the fact that the cyclone separator and the roasting chamber are arranged in a common housing. The housing is wider than it is tall, so that the appliance can be readily installed in rooms with ordinary dimensions. Furthermore, this construction results, on the one hand, in minimal surface area, so that the thermal losses can be kept low. On the other hand, the flow paths are short, so that the pressure loss is minimized. In particular, no pipe conduits and the like are required for the gas, which partially determine both the thermal losses and the pressure losses.

Fundamentally, the fluidized bed can be produced by inlet gas. According to one preferred embodiment of the invention, the flow in the lower or the upper area of the inner chamber is connected to that in the outer chamber, so that at least part of the gas is in circulation. This has the advantage that a constant warming of the gas is avoided and energy consumption is optimized.

It is favorable if the outer chamber and/or the inner chamber have essentially circular cross sections. Here, it is practical if the outer and the inner chamber are concentric to each other. In this way, especially for the outer chamber forming the cyclone separator, optimal flow conditions are realized for the exhaust gas, which flows in the essentially annular outer chamber around the inner chamber from the outlet to the inlet of the inner chamber.

It is practical if there is a ventilator to generate the rotary flow in the upper or the lower area of the inner chamber. The intake side of the ventilator is connected to the inner chamber while its pressurized side is connected to the outer chamber. The ventilator can be designed as a radial aerator with its aerator wheel coaxial to the inner and/or the outer chamber. Such an aerator is easy to install and produces the desired rotary flow in the outer chamber. Further, in the case of installation in high or low areas, the motor can remain outside the roaster, which is advantageous in respect to heat generation and accessibility for maintenance.

Furthermore, there can be guide baffles in the gas flow between the walls of the inner and the outer chambers, which reinforce the formation of the rotary flow. Thereby an intensified rotation of the exhaust gas can be produced as it flows through the outer chamber to the inlet of the inner chamber in order to better separate the solid particles.

Normally there is at least one heating device in the gas flow outside the fluidized bed in order to heat the gas to the desired temperature. In the case of the second embodiment with the perforated base in the outer chamber, especially for larger roasters, the heating device can include at least one burner with a flame tube which passes into the inner chamber from above. The flame tube can extend far into the inner chamber and it can have at least one opening, through which at least a partial flow of the returning gas makes its way into the flame tube for after burning. This makes it possible to heat the gas directly without affecting the roasting material. Nevertheless, the roaster appliance remains compact, since the burner requires hardly any additional installation space.

The heating device can include at least one burner, which opens tangentially into the outer chamber. Thereby the rotary flow can also be reinforced in the outer chamber. This arrangement is especially advantageous in the case of larger roasters with the perforated base in the inner chamber.

Especially for smaller roasters, it is practical for the heating device to consist of electrical heating elements. The heating elements can be designed as heating rods in the outer chamber or, e.g., as heating coils mounted in the inner chamber.

According to the physical requirements, solids are carried radially outward in the cyclone separator. It is practical for the outer chamber to have at least one radially outward opening for removal of the separated solid particles. This opening can be opened shortly before the end of the roasting process but also periodically or constantly during the roasting process. An accumulation of the solids is then avoided.

Especially in the case of the embodiment with the perforated base located in the inner chamber, the base is relatively difficult to access for filling or emptying. Consequently, the perforated base can be at least partly collapsible for removal of the material. The roasted material can then be removed from the inner chamber, while the outer chamber has a corresponding removal opening below the inner chamber. In the case of the first embodiment with the interior perforated base, this area of the outer chamber is also readily accessible.

Fundamentally, a collapsible perforated base is also possible in the embodiment with the perforated base in the outer chamber. But an outer opening in the side wall of the outer chamber at the level of the sieve base is also adequate. For emptying, this is merely opened and the roasted material automatically drops out of the opening due to the rotary flow.

Furthermore, it can be advantageous if the outer wall of the outer chamber or the walls of both chambers are at least partially transparent. This has the advantage that the roasting process can be observed. Especially for smaller roasters it is possible for the walls to made of glass. An attractive outer appearance is effected, so that the roaster can be set up for monitoring purposes in coffee shops and the like.

The roaster according to the invention is equally suitable for small and large charges. For larger charges, the use of gas burners to produce the necessary thermal energy is meaningful. For smaller charges, the use of electrical heating energy can be more favorable. The course of the gas flow is always uniform and reduced to a minimum. In the case of the first embodiment, the gas flows from below, through the perforated base, and into the inner chamber. In the ventilator mounted above this section, a rotary flow is produced from top to bottom in the outer chamber. There, the gas again enters the inner chamber. In the other embodiment, a rotary flow from the bottom to the top is produced by a ventilator adjoining the lower part of the inner chamber. The rotary flow produces a fluidized bed above the perforated base in the inner chamber and flows from above back into the inner chamber. Thus, there is always a rotary flow behind the fluidized bed, which effects the expulsion of the undesirable solid particles.

BRIEF DESCRIPTION OF THE DRAWINGS

The invention is described in greater detail below with references to the appended drawings. Shown are.

DETAILED DESCRIPTION OF THE PREFERRED EMBODIMENT

The roaster depicted in FIGS. 1–5 for the thermal processing of granular material, especially for roasting coffee, includes a perforated base (11), which supports the material to be roasted. The perforated base (11) is located in an inner chamber (12), which is essentially a hollow cylinder. This inner chamber (12) is enclosed in an outer chamber (13). The outer chamber (13) is also a hollow cylinder and is concentric to the inner chamber (12).

Figure 1:
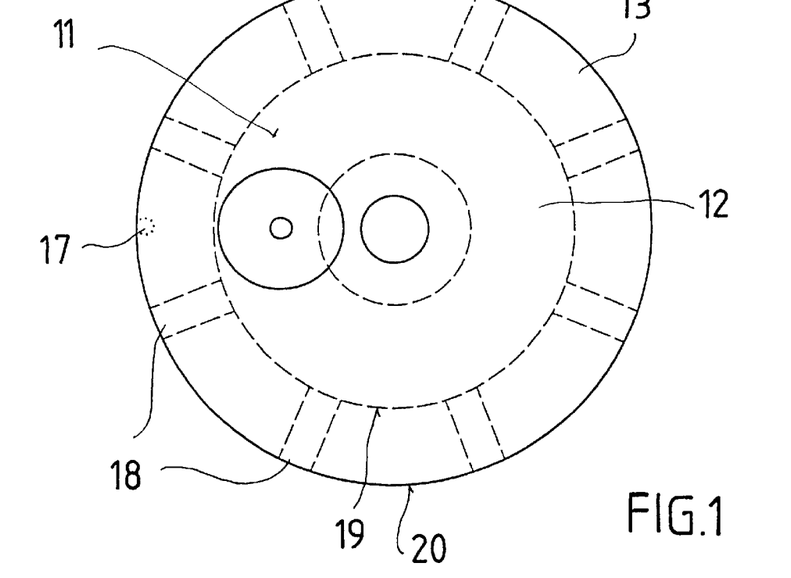
FIG. 1, a top view of an open roaster according to a first embodiment of the invention.
Figure 2:
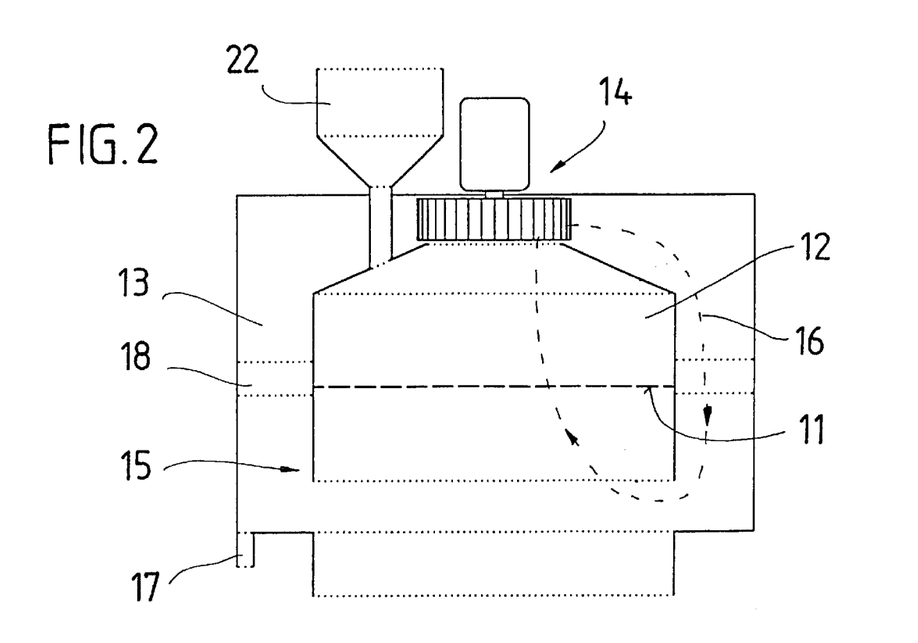
FIG. 2, in cross section, a side view of the roaster in FIG. 1.
Figure 3:
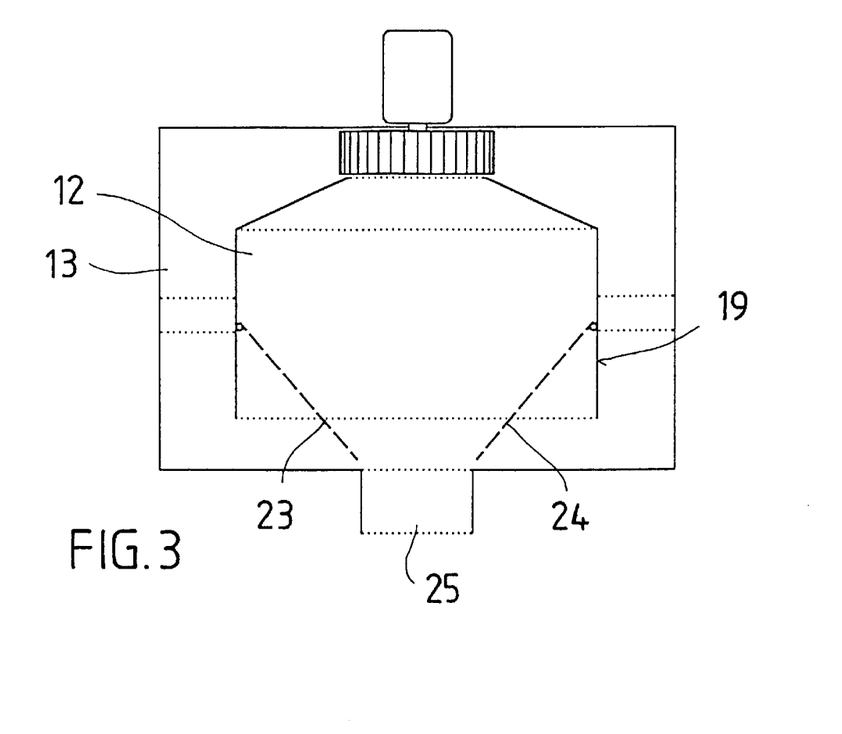
FIG. 3, the roaster in FIG. 2 in the emptying phase.
Figure 4:
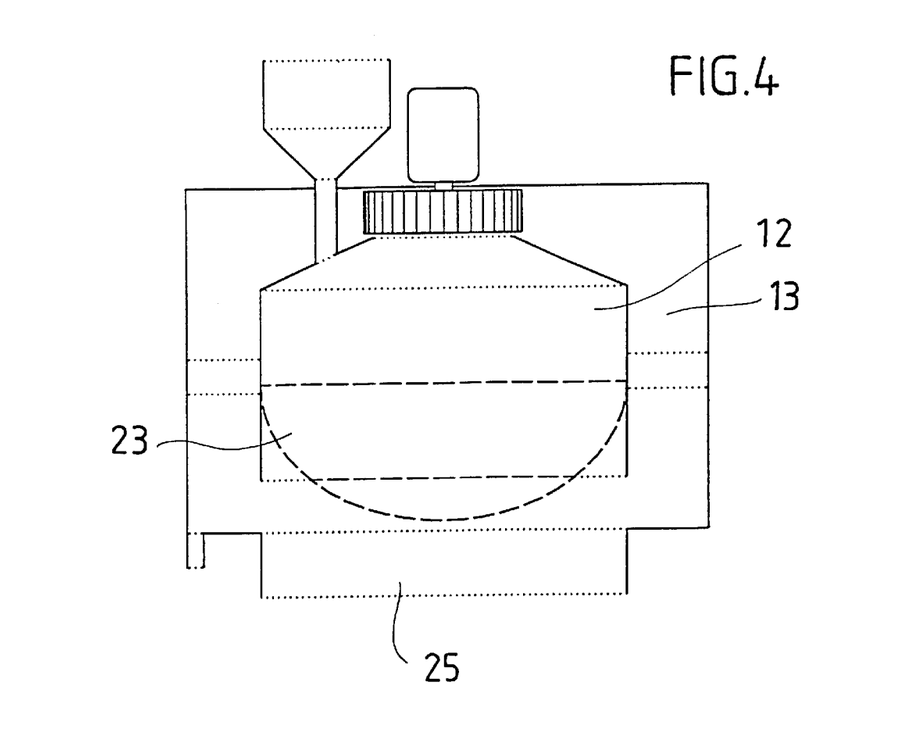
FIG. 4, the roaster in FIG. 2 in the emptying phase in anther embodiment.
Figure 5:
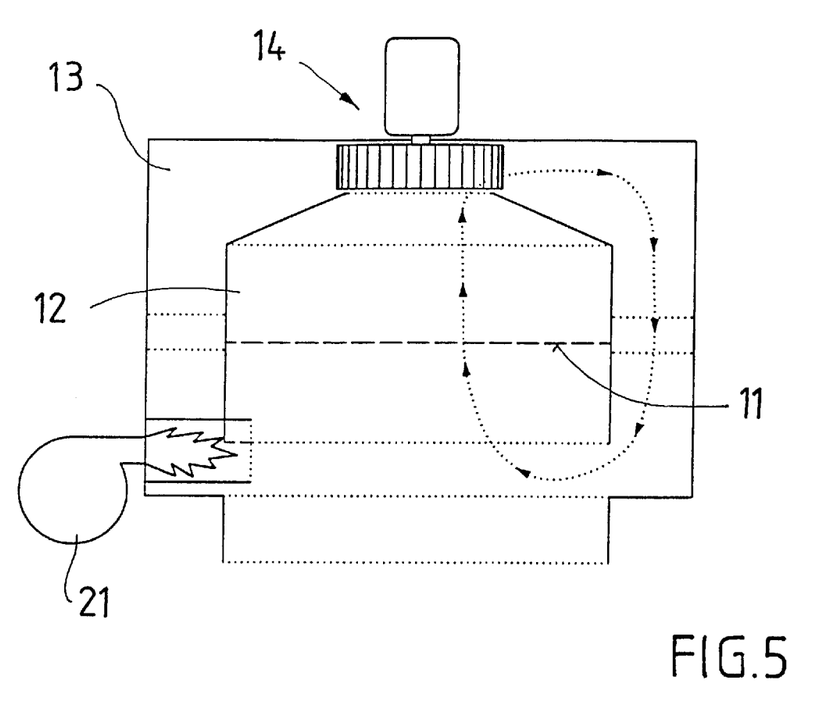
FIG. 5, the roaster in FIG. 2 with a burner.

The sieve base (11) in the illustrated embodiment is approximately at the midpoint of the inner chamber (12). Fundamentally, the perforated base can also be located lower down. Adjoining the upper part of the inner chamber (12) is a radial aerator (14), whose suction side faces the perforated base. The pressurized side opens into the outer chamber (13). The flow in the lower part (15) of the inner chamber connects to the flow in the outer chamber (13). Specifically, the arrangement is such that the inner chamber is open at the bottom and ends inside the outer chamber.

During the operation, a rotary flow (16) of the gas is produced from top to bottom in the outer chamber (13). The gas enters the inner chamber (12) at the bottom, flows through the perforated base, and forms a fluidized bed of the roasting material that is not shown. Thus the gas is driven in circulation.

By virtue of the rotary flow (16) in the outer chamber, the entrained solid particles, e.g., the chaff of the raw coffee, are forced radially outward and thus removed from the gas flow. There is a radially outer opening (17), through which these solid particles can be removed from the roaster. The radial aerator will basically produce an adequate rotary flow. For a more intense spinning effect, guide baffles (18) can be provided between the walls (19, 20) of the inner and the outer chambers. The guide baffles are represented by broken lines in the drawing.

For heating the gas, electrical heating elements that are not shown can be provided in the outer chamber (13). In the case of the embodiment in FIG. 5, heating of the gas flow is provided by a burner (21), which opens radially into the outer chamber (13). The rotary flow is also reinforced thereby.

The roasting material is introduced by means of a filling funnel (22) onto the perforated base (11) in the inner chamber (12). Following the roasting, the roasted material must be removed from the chamber (12) in turn. It is basically possible to tilt the entire roaster. In the embodiment shown in FIG. 3, the perforated base is collapsible. Specifically, the arrangement is such that the perforated base has two halves (23, 24), which are peripherally hinged to the wall (19) of the inner chamber. In the embodiment shown in FIG. 4, the perforated base is also divided, although the halves are hinged along the diameter. In both cases, the outer chamber (13) has in its lower part a corresponding, closable opening (25), through which the roasted material reaches the outside. The perforated base can be completely collapsible. However, it can also be sufficient for only one half (23) or (24) of the perforated base to be collapsible, since the roasted material is moved horizontally by spinning and can thus be ejected.

The roaster illustrated in FIGS. 6–10 for roasting coffee has a perforated base (31), which supports the roasting material. The perforated base (31) is located in an essentially hollow-cylinder outer chamber (32). The outer chamber (32) surrounds an inner chamber 33. The inner chamber 33 is also shaped like a hollow cylinder and is concentric to outer chamber 32.

Figure 6:
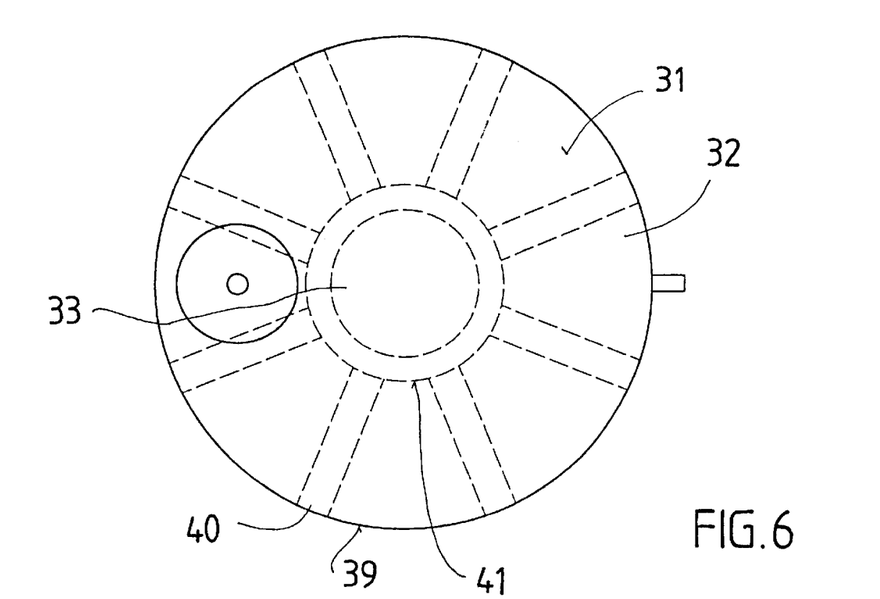
FIG. 6, a top view of an open roaster according to a second embodiment of the invention.
Figure 7:
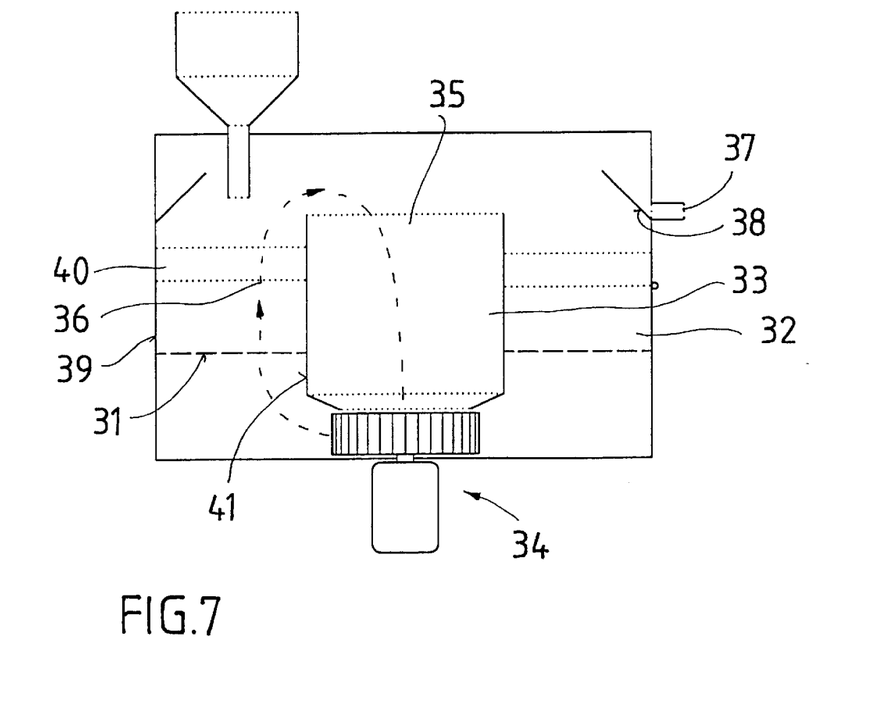
FIG. 7, in cross section, a side view of the roaster in FIG. 6.

In the embodiment shown, the essentially annular sieve base (31) is in the lower region of the outer chamber (32). Fundamentally, the perforated base can also be positioned higher up. Adjoining the lower part of the inner chamber (33) is a radial aerator (34), whose suction side faces up into the inner chamber. The pressurized side opens into the outer chamber (32). The flow in the upper part (35) of the inner chamber (33) connects to the flow in the outer chamber (32). Specifically, the arrangement is such that the inner chamber (33) is open at the top and ends inside the outer chamber (32).

During operation, a rotary flow (36) of the gas from bottom to top is effected in the outer chamber (32) by the radial aerator. The gas flows through the perforated base (31) and forms a fluidized bed of the roasting material that is not shown. It has been proven that this maintains the spinning the best. Due to the rotary flow over the perforated base in the outer chamber (32), the entrained solid particles are driven radially outward from the fluidized bed and thus removed from the gas flow. In the upper part of the outer chamber there is a radially outward opening (37), via which these solid particles can be removed from the roaster. There can be encircling blocking baffles (38) which prevent the separated solid particles from sliding down along the wall (39). Fundamentally, the radial aerator will produce an adequate rotary flow. For a more intense rotary effect, guide baffles (40) running between the walls (39, 41) of the outer and the inner chambers can be provided above the perforated base (31). The guide baffles are represented by broken lines in the drawing.

The gas that does not contain solids enters the inner chamber (33) at the top, where it is drawn in by the aerator (34) and blown back into the outer chamber (32). Thus the gas can be driven in circulation.

For heating the gas, there can be electrical heating elements that are not shown, preferably in the inner chamber (33). In the embodiment shown in FIG. 9, the gas flow is heated by means of a burner (42), which opens via a flame tube (43) into the inner chamber (33). In the embodiment in FIG. 10, the flame tube (44) extends far into the inner chamber and is provided with lateral openings (45). Thereby it is possible for part of the return gas to be subjected to afterburning. The afterburning preferably takes place catalytically, so that the temperature of the recombined hot gas can be kept within the desired roasting temperature range.

Figure 8:
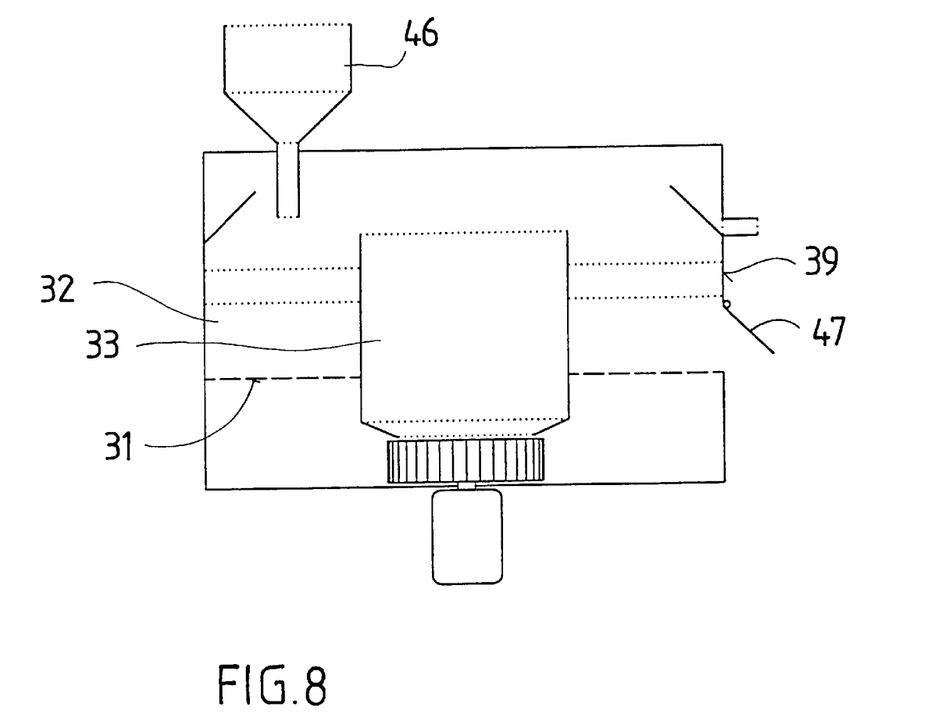
FIG. 8, the roaster in FIG. 7 in the emptying phase.
Figure 9:
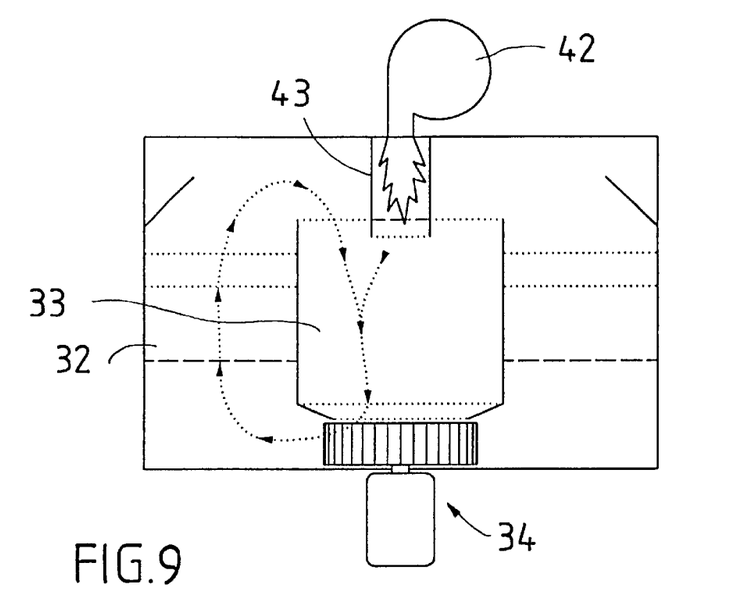
FIG. 9, the roaster in FIG. 7 with a burner.
Figure 10:
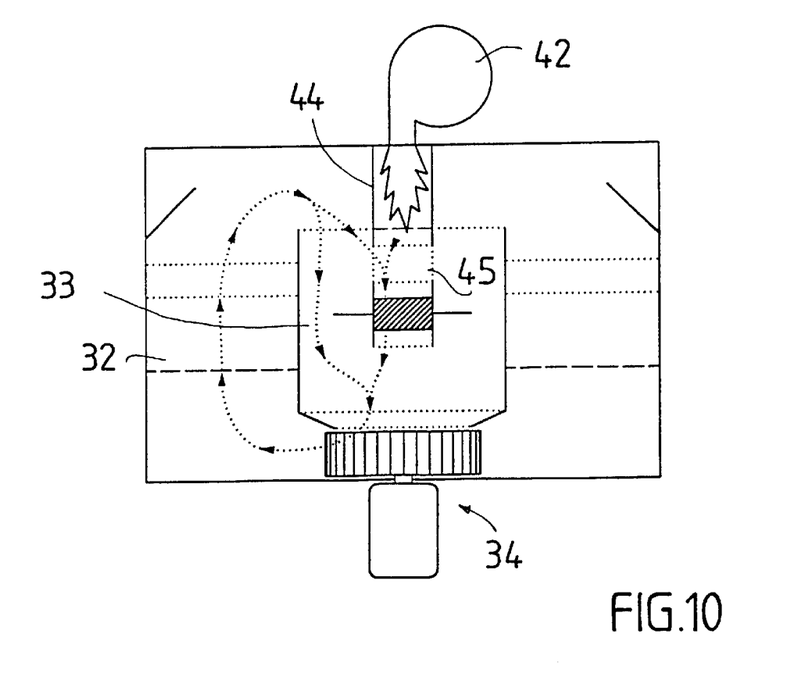
FIG. 10, the roaster in FIG. 7 with a burner and afterburning.

The roasted material is introduced at the top through a filling funnel (46) onto the perforated base (31) in the outer chamber (32). Following the roasting, the roasted material must be removed from the chamber (32) in turn. Fundamentally, it is also possible in this case for the entire roaster to be tilted. However, an outer opening (47) in the side wall (39) of the outer chamber at the level of the sieve base can also be adequate. For emptying, the latter is merely opened and the roasted material moved by the rotary flow automatically drops out through the opening.

In both embodiments it has been shown that the rotary flow effects a rotation of the roasting material on the perforated base (31) as well as on the perforated base (11) in the inner chamber. For some roasting processes, it is advantageous for the roasting material to be moistened. Because as the roasting material rotates, it is simply necessary to position a water introduction device, e.g., a spray nozzle, at only one point on the periphery. The roasting material migrates past this point, where due to the fluidized bed a uniform moistening of the material can be effected.

It is evident from the drawings that both embodiments of the roaster are very compact. The free surface area is reduced to a minimum, whereby the thermal losses can be kept low. Furthermore, the flow paths are very short and in particular, they are optimized at the transition from the inner to the outer chamber by the introduction of a radial aerator. The pressure losses can also be greatly reduced.

What is claimed is:

1. In an appliance for roasting coffee beans, wherein the coffee beans to be roasted lies on a perforated base (31), a gas flows through the base from below creating a fluidized bed, and exhaust gas is fed from said fluidized bed to a cyclone separator for separation of entrained solid particles, the improvement comprising said base (31) being located in an outer chamber (32) in which at least an area above said base is designed as a cyclone separator, said outer chamber at least partially enclosing an inner chamber (33) through which the gas is fed from beneath said base into said outer chamber in a rotary flow (36).

2. An appliance according to claim 1, wherein a flow of gas in an upper part (35) of said inner chamber (33) connects to a flow of gas in said outer chamber (32) so that at least part of the gas circulates.

3. An appliance according to claim 1, wherein at least one of said outer chamber (32) and said inner chamber (33) has a substantially circular cross section.

4. An appliance according to claim 3, wherein said outer chamber (33) and said inner chamber (32) are substantially concentric to each other.

5. An appliance according to claim 1, further comprising a ventilator (34) which produces said rotary flow and which is located in a lower part of said inner chamber (33), wherein a suction side of said ventilator faces said inner chamber (33) while a pressurized side of said ventilator faces said outer chamber (32).

6. An appliance according to claim 5, wherein said ventilator (34) is a radial aerator having an aerator wheel which is coaxial to at least one of said inner and outer chambers.

7. An appliance according to claim 1, further comprising guide baffles (40) for reinforcing said rotary flow in the gas flow between a wall of said inner chamber and a wall of said outer chamber.

8. An appliance according to claim 1, further comprising at least one heating device for heating said rotary flow of gas and spaced from said fluidized bed.

9. An appliance according to claim 8, wherein said heating device includes at least one burner (42) with a flame tube (43, 44) which leads downwardly and into a top of said inner chamber (33).

10. An appliance according to claim 9, wherein said flame tube (44) has at least one opening (45) through which at least a partial flow of a return portion of said rotary flow of gas enters into said flame tube for afterburning.

11. An appliance according to claim 1, wherein said outer chamber (32) has at least one radially outward opening (37) for removing the separated solid particles.

12. An appliance according to claim 1, wherein said outer chamber (32) has a side wall with an outer opening (47) which is located at a level corresponding to said base and through which the coffee beans are removable.

13. An appliance according to claim 1, wherein said outer chamber has an outer wall (39) and wherein at least a portion of said outer wall is transparent.

* * * * *

UNITED STATES PATENT AND TRADEMARK OFFICE
CERTIFICATE OF CORRECTION

PATENT NO.   : 6,564,470 B2
DATED        : May 20, 2003
INVENTOR(S)  : Krueger It is certified that error appears in the above-identified patent and that said Letters Patent is hereby corrected as shown below:

<u>Title page,</u>
Insert Item -- [30] Foreign Application Priority Data
          March 24, 2000     (DE)………………...200 05 577.1 --

Signed and Sealed this

Eighteenth Day of May, 2004

JON W. DUDAS
*Acting Director of the United States Patent and Trademark Office*